Dec. 25, 1923. 1,478,819
C. CRETORS
PAN FOR POPPING CORN
Filed Oct. 30, 1922
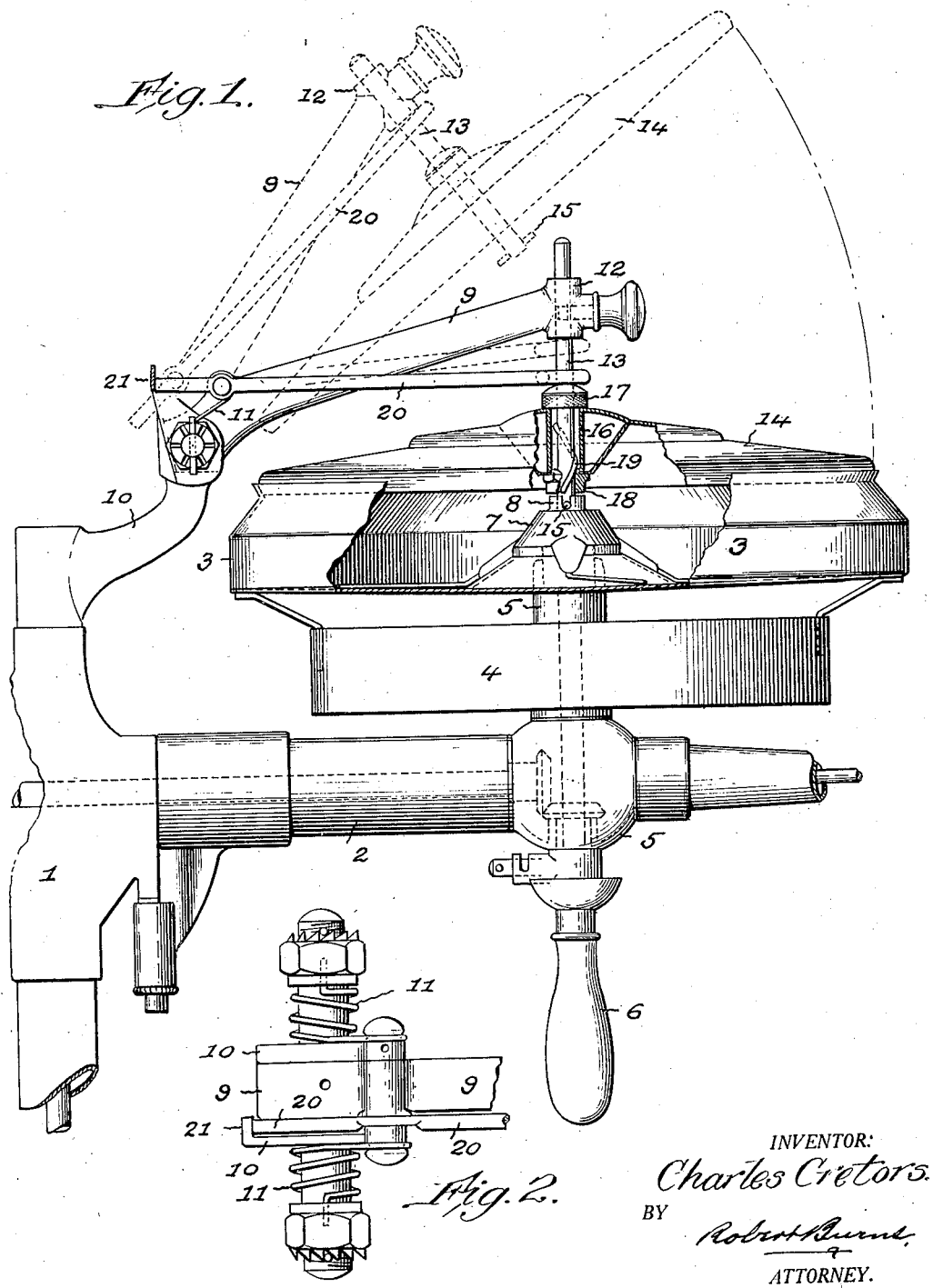
INVENTOR:
Charles Cretors.
BY
Robert Burns,
ATTORNEY.

Patented Dec. 25, 1923.

1,478,819

UNITED STATES PATENT OFFICE.

CHARLES CRETORS, OF CHICAGO, ILLINOIS.

PAN FOR POPPING CORN.

Application filed October 30, 1922. Serial No. 597,791.

*To all whom it may concern:*

Be it known that I, CHARLES CRETORS, a citizen of the United States of America, residing at Chicago, in the county of Cook and State of Illinois, have invented a certain new and useful Improvement in Pans for Popping Corn, of which the following is a specification.

This invention relates to the pan unit of a corn popping apparatus in which the cover which closes the open top of the pan is automatically released and lifted away from the popping pan at the proper period in the operation, an example of which forms the subject matter of Letters Patent No. 1,279,663, issued September 24th, 1918, to Charles Cretors. And the present improvement has for its object:—

To provide a simple and efficient structural formation and association of parts and mechanisms whereby the pan cover is automatically released and lifted away from the pan when a proper degree in the corn popping operation is reached, and in which a retardation of the normal rotation of the pan cover, to effect the described cover release is a material feature, all as will hereinafter more fully appear.

In the accompanying drawing:

Fig. 1, is a vertical sectional elevation of the pan portion of a corn popping apparatus, embodying the present improvement.

Fig. 2, is a detail plan of the carrying arm of the pan cover and associated parts and mechanisms.

Like reference numerals indicate like parts in the two views.

Referring to the drawing, 1, designates a tubular support having a tubular horizontal branch 2 upon which is revolubly mounted the popping pan 3 and its accessories, with the driving mechanism of the stirrer means arranged in the interior of the support 1 and its horizontal extension 2 as illustrated in Fig. 1, and as described in detail in Patent No. 1,279,663, above referred to.

The popping pan 3 is preferably of the detail construction set forth in prior application for Letters Patent Serial No. 524,377, filed December 23rd, 1921, and with its fixedly associated heater unit 4 is revolubly mounted on the horizontal extension or branch 2 aforesaid by a tubular post 5, the lower end of which is formed with a handle 6 for convenient turning by hand of the popping pan and its heating unit from the upright position shown in Fig. 1, into an inverted position for dumping the remaining contents of the popping pan, previous to a succeeding popping operation.

7, designates a stirrer head of the popping pan carried centrally therein by a vertical shaft 8 passing down through the tubular post 6 aforesaid, for operative connection with the usual shaft connections that are arranged within the support 1 and its extension 2. In the present construction the upper end of the shaft 8 extends above the stirrer head 7 and is formed for detachable engagement with the carrying shaft of the pan cover, now to be described.

9, designates a swinging arm pivoted at one end in a bracket 10, on the support 1, and having associated with its pivot connection one or more adjustable springs 11, the resilient tendency of which is to swing said arm in an upward direction.

12, designates a journal hub on the swinging end of the arm 9, providing a journal bearing in which the carrying shaft 13 of the pan cover 14 is adapted to have a turning movement, and in the construction shown, the lower end of the shaft 13 is formed for detachable connection with the end of the stirrer driving shaft 8 aforesaid, preferably by means of a cross pin 15 on the shaft 13 engaging in open top recesses in the end of the shaft 8, as shown in Fig. 1.

16, designates a central sleeve forming a portion of the pan cover 14 and provided with upper and lower bearing collars 17 and 18 which encircles the shaft 13 aforesaid.

19, designates a quick pitch thread on the periphery of the shaft 13, having engagement with the lower collar 18 aforesaid, to provide the sole operative connection between said shaft and pan cover, in order that under normal conditions the pan cover will have rotation in unison with said shaft and so that with a local frictional retardance in the rotation of the pan cover, said cover will ride upon the spiral thread 19 to effect a release action hereinafter described.

20, designates a rock arm pivoted intermediate its length on the swinging arm 9 aforesaid, with one end arranged in the path of the aforesaid upper collar 17 of the pan cover, while the other end of said rock arm is adapted to have abutment contact with a lateral abutment lug 21 of the bracket 10 of the main support 1, to normally hold the pan cover 14 and associated parts in the down or lowered position illustrated in full lines in Fig. 1. When the first mentioned end of the rock arm 20 is operated by the upward movement of the pan cover 14 and collar 17 aforesaid, the other end of said rock arm is swung downward out of contact with the abutment lug 21, leaving the before described springs 11 free to raise the pan cover, and accessories to the position shown in dotted lines in Fig. 1.

In the practical operation of the mechanism, as the corn in the popping pan nears the properly popped and expanded condition, the mass rises to frictional contact with the under surface of the pan cover 14 to retard its rotation in unison with its carrying shaft 13, and in consequence the cover rides up on the spiral thread 19, to effect the described tripping operation of the parts.

With the commencement of a succeeding popping operation, the cover mechanism is moved down into the original position above described and shown in full lines in Fig. 1.

Having thus fully described my invention, what I claim as new and desire to secure by Letters Patent, is:—

1. In a corn popping apparatus, the combination of a popping pan, a cover for said pan, means for imparting rotation to said cover, the same comprising a vertically arranged shaft having a quick pitch spiral connection with said pan cover, adapted to normally cause the pan cover and the shaft to rotate in unison and with a frictional resistance to the rotation of the cover to cause said cover to move upwardly upon the shaft, a lifting means tending to lift the cover away from the popping pan, and a holding means for said lifting means adapted to normally maintain the pan cover in its down position and to be operated to a release by an upward movement of the pan cover under the influence of the aforesaid spiral connection.

2. In a corn popping apparatus, the combination of a popping pan, a stirrer mechanism revolubly mounted in said pan, a cover for said pan having operative connection with said stirrer mechanism by a quick pitch spiral formation adapted to normally cause the pan cover to rotate in unison with the stirrer mechanism and with a frictional resistance to the rotation of the pan cover to cause said cover to move upwardly and away from said stirrer mechanism, a lifting means tending to lift the cover away from the popping pan, and a holding means for said lifting means adapted to normally maintain the pan cover in its down position and to be operated to a release by an upward movement of the pan cover under the influence of the aforesaid spiral connection.

3. In a corn popping apparatus, the combination of a popping pan, a cover for said pan, means for imparting rotation to said cover, the same comprising a vertically arranged shaft having a quick pitch spiral connection with said pan cover, adapted to normally cause the pan cover and the shaft to rotate in unison and with a frictional resistance to the rotation of the cover to cause said cover to move upwardly upon the shaft, a resilient means tending constantly to lift the cover away from the popping pan, and a holding means for said lifting means adapted to normally maintain the pan cover in its down position and to be operated to a release by an upward movement of the pan cover under the influence of the aforesaid spiral connection.

4. In a corn popping apparatus, the combination of a popping pan, a stirrer mechanism revolubly mounted in said pan, a cover for said pan having operative connection with said stirrer mechanism by a quick pitch spiral formation adapted to normally cause the pan cover to rotate in unison with the stirrer mechanism and with a frictional resistance to the rotation of the pan cover to cause said cover to move upwardly and away from said stirrer mechanism, a resilient means tending constantly to lift the cover away from the popping pan, and a holding means for said lifting means adapted to normally maintain the pan cover in its down position and to be operated to a release by an upward movement of the pan cover under the influence of the aforesaid spiral connection.

5. In a corn popping apparatus, the combination of a support having a horizontal branch and an upper bracket, a popper pan mounted on said horizontal branch, a stirrer mechanism revolubly mounted in said pan, a cover for said pan, a swinging arm pivoted at one end to the upper bracket of the support aforesaid, a carrying shaft for the cover journalled in the free end of the swinging arm, said shaft having a spiral thread forming the driving connection between said shaft and the pan cover and with said shaft having operative connection with the stirrer mechanism, and a holding means adapted to hold the swinging arm and pan cover in a down position and to release by an upward movement of the pan cover under the influence of the spiral thread aforesaid.

6. In a corn popping apparatus, the combination of a support having a horizontal branch and an upper bracket, a popper pan mounted on said horizontal branch, a stirrer mechanism revolubly mounted in said pan, a cover for said pan, a swinging arm pivoted at one end to the upper bracket of the support aforesaid, a carrying shaft for the cover journalled in the free end of the swinging arm, said shaft having a spiral thread forming the driving connection between said shaft and the pan cover and with said shaft having operative connection with the stirrer mechanism, and a holding means adapted to hold the swinging arm and pan cover in a down position and to release by an upward movement of the pan cover under the influence of the aforesaid spiral thread, the same comprising a rock arm pivoted on the swinging arm aforesaid, with one end arranged in the path of the pan cover and the other end adapted for engagement with a lateral abutment lug on the upper bracket of the support.

Signed at Chicago, Illinois, this 27th day of October, 1922.

CHARLES CRETORS.